Patented Apr. 14, 1942

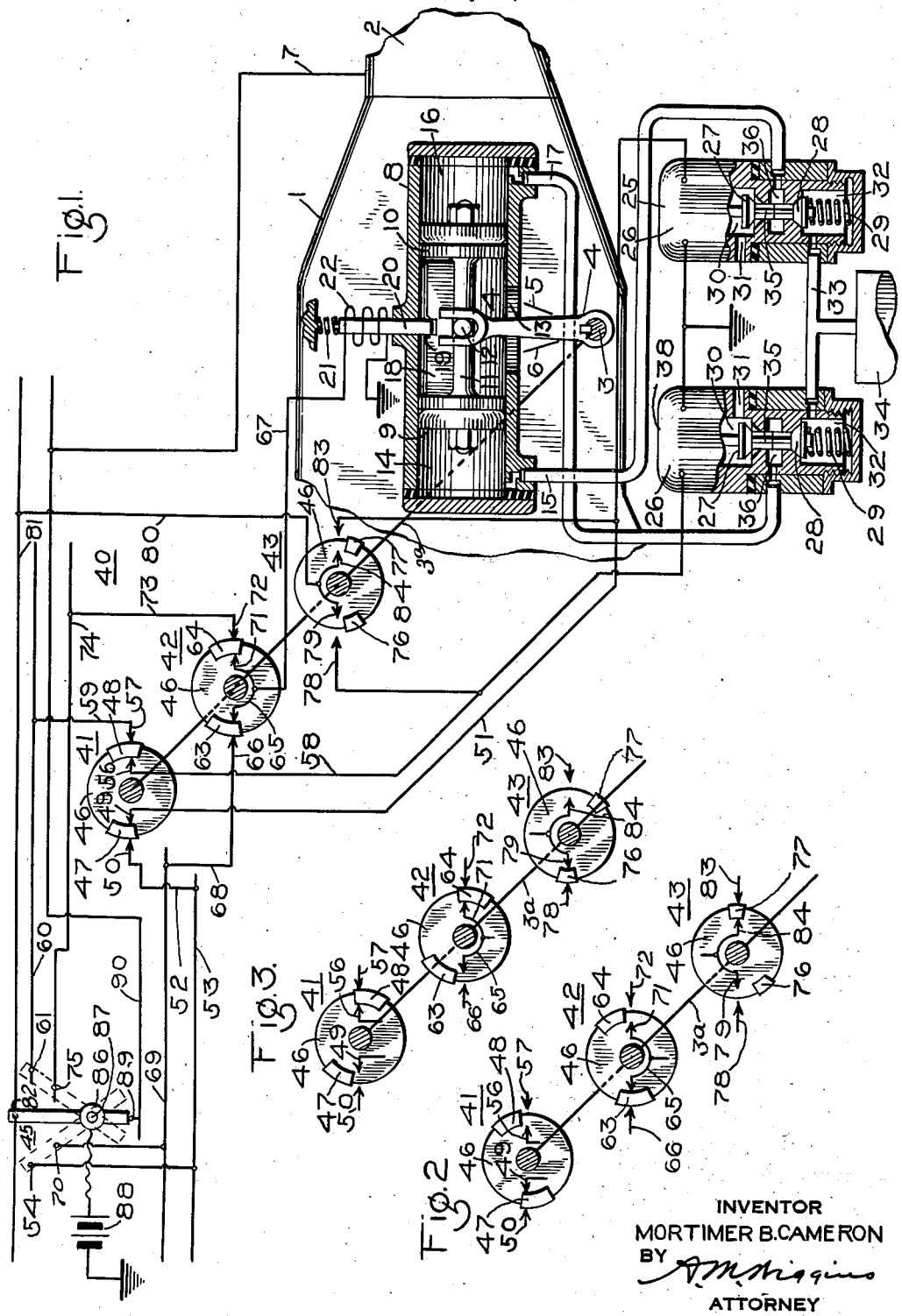

2,279,365

UNITED STATES PATENT OFFICE 2,279,365

CLUTCH MECHANISM

Mortimer B. Cameron, Edgewood, Pa., assignor to The Westinghouse Air Brake Company, Wilmerding, Pa., a corporation of Pennsylvania Application July 27, 1940, Serial No. 347,822

10 Claims. (Cl. 192—3.5)

This invention relates to control mechanisms and more particularly to the power operated type for moving devices such as clutches to their different positions.

In certain railway vehicles propelled by internal combustion engines of the Diesel type a clutch is employed which has a neutral position and at either side of the neutral position a drive position. In one of the drive positions the clutch connects the engine to a hydraulic drive device through which power is transmitted to the driving wheels of the vehicle for starting the vehicle and for accelerating it up to a certain relatively high speed. In the other drive position the clutch provides a direct mechanical drive connection between the propulsion engine and the drive wheels of the vehicle for propelling the vehicle above the high speed just mentioned.

One object of the invention is the provision of a novel power operated control mechanism for multi-position devices such as the clutch just described.

Another object of the invention is the provision of a power operated control mechanism which is relatively simple in construction and particularly adapted for remote control, so that an operator at a control station in one part of a vehicle may through the medium of simple control means control a device such as a clutch from a remote part of the vehicle.

Another object of the invention is the provision of a novel electropneumatic power control mechanism embodying pneumatically operated power means for effecting movement of a device such as a clutch to its different positions and an electric switch device located convenient to the operator for controlling the pneumatically operated means through the medium of electrical conductors.

The clutch on certain of these vehicles is held in its driving positions and in its non-operating or neutral position by the pressure of springs acting through toggle mechanisms, the dead center positions of which are in the neutral position of the clutch. Power is therefore required for moving the clutch substantially to its several different positions but is not required for holding the clutch in said positions.

Another object of the invention is therefore the provision of a power operated control mechanism for a clutch in which power is employed only for moving the clutch to its different positions, the power being then cut off in said positions in order to conserve energy.

Interposed in the connection between the clutch and driving wheels on certain of these vehicles is a transmission device having various positions, such as forward and reverse, for controlling the direction of movement of the vehicle. As will be apparent, it would not only be objectionable but also dangerous to operate this transmission device to change the direction of movement of the vehicle while the propulsion motor of the vehicle is connected to the propulsion wheels.

Another object of the invention is therefore the provision of means for preventing operation of the transmission device in either of the drive positions of the clutch and providing for operation of the transmission device only in the neutral position of the clutch.

Some of these vehicles are provided with multiple engines, clutches, and transmission devices, and it is possible that these vehicles may be operated in trains. In either case it is desired that all of the clutches and transmission devices be controlled in unison from one control station, and another object of the invention is therefore the provision of an improved clutch and transmission control system for accomplishing this end.

Other objects and advantages will be apparent from the following more detailed description of the invention.

In the accompanying drawing; Fig. 1 is a diagrammatic view, partly in section and partly in elevation, of the improved control mechanism and of a portion of a power clutch and transmission device such as employed for transmitting power from an internal combustion engine to the propulsion wheels of a vehicle; and Figs. 2 and 3 are diagrammatic views of a portion of the mechanism shown in Fig. 1 in different control positions which it is adapted to assume.

Description

In the drawing the reference numeral 1 indicates a portion of a clutch housing looking at one side thereof and which contains a clutch (not shown) for connecting an internal combustion engine to the drive wheels of a vehicle, while the reference numeral 2 indicates a part of a housing of a selective power transmission device having different control positions, such as forward and reverse for controlling the direction of movement of the vehicle.

Projecting from one side of the clutch housing 1 is a shaft 3 which is rockable to different positions to control the position of the clutch within said housing. An arm 4 secured to the shaft 3 outside of the housing 1 is provided for rocking said shaft to its different clutch control positions.

The shaft 3 and arm 4 have three different clutch control positions, namely, a neutral position in which these parts are shown in the drawing and driving positions indicated by the lines 5 and 6 at either side of the neutral position. In the neutral position the clutch parts are adapted to be disengaged and therefore non-operating. In one of the driving positions 5 or 6 the clutch is adapted to provide a direct mechanical drive connection between the propulsion motor of the vehicle and the propulsion wheels, while in the other drive position the clutch is adapted to provide a drive connection between the propulsion motor and a hydraulic power device through which power is adapted to be transmitted to the wheels of the vehicle for propelling same.

The transmission device 2 may be of any desired type and controlled in any desired manner, the conditioning thereof being dependent, however, upon the energization of a conductor wire 7, so that when said wire is deenergized the condition of the transmission device cannot be changed, or in other words, the condition of the transmission device can be changed to effect, for example, forward or reverse movement of the vehicle when and only when the wire 7 is energized.

A further showing of the parts of the clutch device 1 and transmission device 2 and a more detailed description thereof are not deemed essential for a clear and comprehensive understanding of the invention, since the invention is limited to means for controlling the positioning of the rock shaft 3 and arm 4 and the energization and deenergization of wire 7, the applications of which are not limited to any specific devices.

For rocking the arm 4 and thereby the shaft 3 to its different control positions above described, a pneumatic power cylinder device 8 is provided which may be secured to the clutch housing 1. This cylinder device comprises a casing containing two movable abutments, preferably in the form of pistons 9 and 10, which are spaced apart and operatively connected together by a stem 11. Intermediate the ends of stem 11 a pin 12 projects from one side thereof and the upper end of the operating arm 4 which is bifurcated, straddles this pin.

By this arrangement it will be apparent that movement of the pistons 9 and 10 in either direction from the neutral position shown is adapted to rock the arm 4 and thereby the shaft 3. Movement of the pistons in the direction of the left hand, as viewed in the drawing, is adapted to be limited by the engagement of piston 9 with the end of the casing, in which position the shaft arm 4 is adapted to occupy the clutch drive position indicated by the line 6. Movement of the pistons in the opposite direction is adapted to be limited by engagement of piston 10 with the casing in which position the arm 4 is adapted to occupy the clutch drive position indicated by the line 5. The arm 4 extends through a slot 13 in the casing for engagement with pin 12, and this slot is of sufficient length to provide for movement of said arm to its different positions, just mentioned.

The piston 9 has at its outer face a chamber 14 which is open to a pipe 15 through which fluid under pressure is adapted to be supplied to said chamber by effecting movement of the pistons 9 and 10 and thereby of the shaft operating arm 4 to its right hand positions, above mentioned. At the outer face of piston 10 there is a chamber 16 which is open to a pipe 17 through which fluid under pressure is adapted to be supplied to said chamber for moving the pistons 9 and 10 to their left hand positions above mentioned for thereby rocking the arm 4 to the position indicated by the line 6.

The pistons 9 and 10 are shown in their neutral positions and when so positioned it will be noted that the shaft operating arm 4 also occupies its neutral position.

Extending between the pistons 9 and 10 above the stem 11 and preferably formed integral therewith is a rib 18. In the upper face of this rib and midway between its ends, a recess or cavity 19 is provided which, when the pistons 9 and 10 are in their neutral positions, is adapted to be disposed to receive a locking pin 20 for securing said pistons against movement. In the illustration the locking pin 20 is slidably mounted in a suitable bore through the casing of cylinder device 8 and extends beyond the outside of said casing. Acting on the outer end of pin 20 is a spring 21 which is under compression for urging said pin into the cavity 19. The pin 20 constitutes the armature of an electro-magnet device having an electric coil 22 so arranged with respect to said armature that upon energization of the coil the armature 20 will be moved against the spring 21 out of the recess 19 to thereby permit movement of the pistons 9 and 10 for positioning the arm 4 and shaft 3.

An electro-magnet device 25 is provided for controlling the supply and release of fluid under pressure to and from the piston chamber 14. This device comprises an electromagnet 26 and a pair of oppositely seating, co-axially arranged valves 27 and 28 arranged to be moved in one direction by said magnet upon energization thereof. A spring 29 is provided for moving the valves in the opposite direction upon deenergization of magnet 26.

The valve 27 is contained in the chamber 30 which is open to the atmosphere through a vent port 31. The valve 28 is contained in a chamber 32 which is open to a pipe 33 supplied with fluid under pressure from any suitable source such as a reservoir 34. The spring 29 is contained in the chamber 32 and acts on the valve 28 for urging same to its seated position and for at the same time unseating the valve 27. The valves 27 and 28 are provided with coaxially arranged fluted stems 35 extending in the direction of each other and engaging in a chamber 36 which is open to the pipe 15.

An electro-magnet device 38 is provided for controlling the supply of fluid under pressure to and the venting of fluid under pressure from the pipe 17 and thereby from the piston chamber 16. This device is identical in structure to the electro-magnet device 25, and the same reference numerals have therefore been used to indicate the different parts thereof.

For controlling the energization and deenergization of the electro-magnet devices 25 and 38 and thereby the operation of the pneumatic cylinder device 8 there is provided an electric circuit selector mechanism 40 which includes three circuit changing devices 41, 42 and 43 conditionable in accordance with the position of the pistons 9 and 10, and a manually operative switch device 45 which is adapted to be located on a vehicle convenient for operation by the operator.

For the purpose of illustration each of the circuit changing devices 41, 42 and 43 comprises a disk 46 which is secured to an extension 3a of the shaft 3 so as to rock with said shaft upon movement to its three different clutch control positions.

The circuit changing device 41 further comprises a pair of arcuate shaped contacts 47 and 48 secured to the disk 46 substantially diametrically opposite each other and suitably insulated from each other. The contact 47 is provided for controlling the making and breaking of an electrical connection between two fixed contact fingers 49 and 50, the contact 49 being connected to a wire 51 leading to one terminal of magnet 26 in the electro-magnet device 25 the other terminal of which is grounded. The contact finger 50 is connected to a wire 52 leading to a wire 53 which is connected to a contact 54 in the manually operated switch device 45. The movable contact 48 is provided for opening and closing an electrical connection between contact fingers 56 and 57, the finger 56 being connected by a wire 58 to magnet 26 of the electro-magnet device 38, the other terminal of said magnet being grounded. The contact finger 57 is connected to a wire 59 which in turn is connected to a wire 60 leading to a fixed contact 61 in the manually operative switch device 45.

The circuit changing device 42 may be similar to the device 41 and comprises a pair of oppositely arranged movable contacts 63 and 64 carried by the disk 46 and suitably insulated therefrom and from each other. The contact 63 is provided for controlling an electric circuit between fixed contact fingers 65 and 66, the contact finger 65 being connected by a wire 67 to one terminal of coil 22 the opposite terminal of which is grounded, while the contact finger 66 is connected by a wire 68 to a wire 69 which is connected with a fixed contact 70 in the manually operative switch device 45. The movable contact 64 in the circuit changing device 42 is provided for controlling an electric circuit between two fixed contact fingers 71 and 72, the contact finger 71 being connected with wire 67 while the contact finger 72 is connected by a wire 73 to a wire 74 which is connected with a fixed contact 75 in the manually operative switch device 45.

The circuit changing device 43 comprises two contacts 76 and 77 carried by and movable with the disk 46 and suitably insulated from each other and from said disk. These movable contacts are disposed differently and are preferably of shorter length than the contacts associated with the disks 46 of circuit changing devices 41 and 42 for reasons which will be more clearly brought out hereinafter.

The movable contact 76 is provided for opening and closing an electric circuit between a pair of fixed contact fingers 78 and 79, the contact finger 78 being connected with the wire 58 while the contact finger 79 is connected by a wire 80 to a wire 81 which in turn is connected with a fixed contact 82 in the manually operative switch device 45. The movable contact 77 is provided for making and breaking an electric circuit between two fixed contact fingers 83 and 84, the contact finger 83 being connected to wire 51 while the contact finger 84 is connected to the wire 80.

The manually operated switch device 45 comprises a manually movable contact member 86 which is mounted to turn on and is suitably insulated from a shaft 87. Connected to the contact member 86 is one terminal of a suitable source of electric current such as a battery 88, the other terminal of which is grounded.

The contact member 86 has a neutral position in which it is shown and is adapted to be turned on the shaft 87 in one direction to one clutch engaging position and in the opposite direction to another clutch engaging position, said contact member being shown in dotted form in its two clutch engaging positions. In the neutral position of contact member 86 it connects battery 88 to the contact 82 which is connected to wire 81, and it also connects the battery to a contact 89 which is connected to a wire 90, the wire 7 from the power transmission device 2 being connected with the wire 90. In one of the driving or clutch engaging positions of the contact member 86 it connects the battery 88 to the contacts 75 and 61, while in the other driving or clutch engaging position the battery is connected to the contacts 54 and 70, it being noted that movement of the contact member 86 in either direction out of the neutral position shown cuts off the supply of electric current to the contacts 82 and 89.

Railway vehicles of the type with which this improved control mechanism is adapted to be used may each be provided with more than one propulsion motor and a corresponding number of clutch devices 1 and transmission devices 2 and it is desirable that the clutch devices and transmissions of the several propulsion units be operative in unison. Accordingly, each of the wires 53, 60, 69, 74, 81 and 90 connected to the manually operative switch device 45 constitute a main control wire to which the respective branch wire from the transmission device 2 or the electric circuit selector mechanism 40 is connected. The several wires connected to the contacts in the manually operative switch device 45 may extend from one end to the other of the vehicle and at their ends be provided with suitable connectors (not shown) for connection with corresponding wires on other vehicles, so that when vehicles of this type are operated in trains all of the clutch devices and transmission devices associated with the propulsion unit or units on the several cars of the train may be connected in parallel so as to be controlled in unison in response to operation of a manually operative switch device 45 on the leading or control vehicle of the train.

*Operation*

In operation, let it be assumed that the vehicle provided with this improved control mechanism is at rest and as a consequence the manually movable contact member 86 will be in its neutral position, as shown. Under this condition electric current will be supplied from battery 88 through the contact member 86, contact 89 and wires 90 and 7 to the transmission device 2 so that the transmission device may be adjusted or conditioned to select the direction of movement of the vehicle. Electric current will also be supplied through the contact member 86 and contact 82 to wire 81 and thence through wire 80 to the contacts 79 and 84 in the circuit changing device 43 but this is of no importance at this time since the contacts 76 and 77 are out of contact with the contact fingers 79 and 84.

With the manually operative contact member 86 in its neutral position no current is supplied to the electro-magnet devices 25 and 38 as a result of which both magnets 26 are deenergized and the valves 27 unseated, so that the piston chambers 14 and 16 in the pneumatic cylinder device 8 are both vented. Under this particular condition the pistons 9 and 10 will occupy the position shown for reasons which will be brought out later, and the locking pin 20 will be urged by spring 21 into the recess 19 in rib 18 so as to hold said pistons against movement from their neutral position. The locking pin 20 is operative under this condition since the coil 22 is deenergized. With the pistons 9 and 10 in their neutral positions the operating arm 4 for the clutch control shaft 3 will also be in its neutral position and the clutches on the vehicle will be thus disengaged.

If now it is desired to move the vehicle along the track, the contact member 86 of the manually operative switch device 45 is moved out of its neutral position, as shown, to the proper drive position for starting the vehicle, which position may be assumed to be the position in which said contact member engages contacts 54 and 70. When the contact member 86 is moved out of the neutral position, the supply of electric current is cut off to wire 81 leading to the circuit changing device 43 and also to wire 90 which is connected by wire 7 to the transmission device 2.

With the manually movable contact 86 in the position engaging the contacts 70 and 54 electric current from battery 88 is supplied by wires 69 and 68 to the circuit changing device 42 through which it flows by way of the contact finger 66, movable contact 63, and contact finger 65 to wire 67 leading to the coil 22 of the locking magnet device. This coil is as a result energized and operates to pull the pin 20 out of recess 19 against the opposing force of spring 21 so as to thereby free the pistons 9 and 10 for movement.

With the manually movable contact member 86 in engagement with the contact 54 electric current is also supplied from battery 88 through wires 53 and 52 to the circuit selector device 41. With this device in the neutral position shown current supplied to the wire 52 flows through the contact finger 50, movable contact 47, and contact finger 49 to wire 51 leading to magnet 26 of the electromagnet device 25. The magnet 26 is as a result energized and operates to seat the valve 27 and unseat the valve 28.

With valve 28 unseated fluid under pressure from the reservoir 34 flows through pipe 33 and chamber 32 past the valve 28 to chamber 36 and thence through pipe 15 to piston chamber 14. The pressure of fluid thus obtained in chamber 14 acts on the piston 9 and effects movement thereof and thereby of the piston 10 in the direction of the right-hand to the position defined by engagement between the piston 10 and the end of the casing. As the pistons 9 and 10 are thus operated, the arm 4 and thereby the shaft 3 are rocked to the driving position indicated by the line 5 and in which one of the clutches on the vehicle is caused to operate to connect the propulsion motor on the vehicle to the wheels thereof for causing the vehicle to start moving.

As the clutch operating shaft 3 is rocked to the clutch engaging position just described, said shaft turns the disks 46 in the different circuit changing devices 41, 42 and 43 relative to the fixed contact fingers thereof. In the circuit changing device 41 the movable contact 47 is of such length that just prior to the piston 10 engaging the casing said contact will move out of engagement with the contact fingers 49 and 50 so as to break the circuit through the electromagnet device 25. As a result, the magnet 26 of the electro-magnet device 25 will be deenergized and spring 29 will seat the valve 28 to cut off further supply of fluid under pressure to the piston chamber 14, while the valve 27 will be unseated to vent the fluid under pressure from said chamber to the atmosphere. The piston chamber 16 will at this time be also vented by way of the electro-magnet device 38 so that neither of the pistons 9 and 10 will be subject to fluid pressure in their right-hand clutch engaging positions.

The position of the different circuit changing devices 41, 42 and 43 with the pistons 9 and 10 in their right-hand positions are shown in Fig. 3, it being noted that the movable contact 47 is out of engagement with the contact fingers 49 and 50 as above mentioned, but the movable contact 48 is still in circuit closing relation with the contact fingers 56 and 57. It will also be noted that in the circuit changing device 42 the movable contact 63 has broken the electric circuit between the contact fingers 66 and 65 so that the magnet coil 22 will be deenergized permitting spring 21 to urge the lock pin 20 down against the top of the rib 18 connecting the pistons 9 and 10, which however is of no importance at this time.

After the vehicle is accelerated up to a certain speed at which it is desired to cut in the direct mechanical drive between the propulsion engine and the drive wheels, the movable contact member 86 in the manually operative switch device 45 is moved from its left-hand position above described in a clockwise direction through neutral position to its right-hand position in contact with the contacts 61 and 75. In this position electric current is supplied from the battery 88 through the contact element 86 to wire 74 and thence through wire 73 to the circuit changing device 42. With the device 42 in the position shown in Fig. 3 the movable contact 64 connects the wires 73 and 67 so as to thus supply electric current to coil 22 for energizing same to again draw the locking pin 20 out of contact with rib 18 connecting the pistons 9 and 10.

At the same time, electric current is also supplied from battery 88 through the movable contact member 86, contact 61 and wires 60 and 59 to the circuit changing device 41. With this device in the position shown in Fig. 3 the movable contact member 48 connects the contact fingers 56 and 57 so that current supplied to the wire 59 is adapted to flow through wire 58 to magnet 26 of electro-magnet device 38 to energize said magnet for seating the valve 27 and unseating the valve 28. With the valve 28 in the electro-magnet device 38 unseated fluid under pressure is then supplied from the reservoir 34 to the pipe 17 and thence to piston chamber 16. At this time magnet 26 of electro-magnet device 25 is deenergized so that piston chamber 14 is vented to the atmosphere, as a result of which the pressure of fluid in chamber 16 acting on the piston 10 will effect movement of the pistons 9 and 10 from their right-hand positions in the direction of the left-hand until the piston 9 engages the casing. This movement of the pistons 9 and 10 rocks the clutch shaft operating arm 4 from the drive position indicated by the line 5 to the drive position indicated by the line 6 thereby operating the clutch to provide the desired direct mechanical drive connection between the propulsion motor and the vehicle wheels which is intended for use when the speed of the vehicle exceeds a chosen relative high degree.

As the clutch operating shaft 3 is thus operated, the circuit changing devices 41, 42 and 43 are moved therewith to the positions shown in Fig. 2, it being noted that the movable contact 64 is moved out of circuit closing relation with the contact fingers 71 and 72 so as to cut off the supply of current to the magnet coil 22 due to which spring 21 again urges the locking pin 20 into engagement with rib 18 connecting the pistons 9 and 10, but this is of no importance at this time.

The movable contact 48 in the circuit changing device 41 moves out of circuit closing relation with the contact fingers 56 and 57 just prior to the piston 9 engaging the casing so as to thereby cut off the supply of electric current to magnet 26 of the electro-magnet device 38. This magnet is therefore deenergized which permits spring 29 to seat the valve 28 and unseat the valve 27 as a result of which fluid under pressure is vented from the piston chamber 16 through pipe 17 and past the valve 27 to the atmosphere by way of vent port 31. The piston chambers 16 and 14 are thus both vented at this time, as was the case when the pistons occupied their opposite clutch engaging positions, this being desirable since the pistons are provided only for the purpose of moving the clutch parts substantially to their driving positions and are not required to hold said parts in such positions.

In the right hand position of the movable contact member 86 the supply of current to wire 90 is cut off the same as in the left hand position of said contact member so that in both of these positions the wire 7 will be deenergized and the condition of the transmission device 7 cannot be changed. It will thus be apparent that the condition of the transmission device, i. e., whether it will provide, for example, either forward or reverse movement of the vehicle, can be changed when and only when the contact member 86 is in its neutral position causing the parts of the clutch to be disengaged so as to disconnect the propulsion engine from the transmission.

When it is desired to disengage the clutch on the vehicle, as when bringing the vehicle to a stop subsequent, for instance, to the direct mechanical drive clutch being effective, the movable contact member 86 of the manually operative switch device 45 is turned from its right-hand position back to its neutral position shown, in which electric current from battery 88 is supplied through the contact 82 and wires 81 and 80 to the circuit changing device 43. With the circuit changing device 43 in the position shown in Fig. 2 at this time, electric current supplied thereto by wire 80 flows through contact finger 84, movable contact 79, and contact finger 83 to wire 51 leading to magnet 26 of the electro-magnet device 25. This magnet is as a result energized and operates to seat the valve 27 and unseat the valve 28, as a result of which, fluid under pressure is again supplied from the reservoir 34 through the pipe 15 to piston chamber 14 wherein it acts on the piston 9 to effect movement thereof and of piston 10 in the direction of the right hand. It will be noted that the contact 77 in the circuit changing device 43 is relatively short and so arranged that just prior to pistons 9 and 10 obtaining their neutral position said contact will move out of circuit closing relation with the contact fingers 83 and 84 and thereby cut off the supply of electric current to magnet 26 of the electro-magnet device 25. The magnet 26 as a result becomes deenergized permitting seating of valve 28 and unseating of valve 27, as a result of which, fluid under pressure is vented from the piston chamber 14 through the pipe 15 to the atmosphere, such venting occurring at just about the time the two pistons obtain their neutral positions.

With the movable contact element 86 of the manually switch device 45 in its neutral position no current is supplied for energizing the magnet coil 22, as a result of which the spring 21 is effective to hold the locking pin 20 in engagement with the top of rib 18 connecting the pistons 9 and 10. As the pistons 9 and 10 are moved from their left hand positions toward their neutral positions as just described, such movement is relative to the locking pin 20 so that when the neutral position is obtained, the spring 21 will urge the locking pin 20 into recess 19 for preventing movement of the pistons past the neutral position.

The operation of the pistons 9 and 10 just described will act to rock the arm 4 and thereby the clutch shaft 3 to their neutral positions for disengaging the clutch on the vehicle and the locking pin 20 will then act to hold the clutch in said neutral or non-driving position until it is again desired to propel the car at which time the manually operated switch device 45 will be moved out of neutral position to effect operation of the clutch control mechanism as above described.

It might be desired to stop the vehicle from a speed obtained with the movable contact 86 of the manually operated switch device in its left-hand position. In order to accomplish this it is merely necessary to move the movable contact member 86 to the neutral position shown to supply electric current from the battery 88 through the wires 81 and 80 to the circuit changing device 43, as above described. However, at this time the circuit changing device will be in the position shown in Fig. 3, so that electric current supplied thereto will in this case flow through the contact finger 79, movable contact 76, and contact finger 78 to the wire 58 leading to magnet 26 of the electro-magnet device 38. This magnet will thus be energized to cause seating of the valve 27 and unseating of the valve 28 so as to supply fluid under pressure from the reservoir 34 through the pipe 17 to piston chamber 16. At this time the piston chamber 14 will be vented so that the pressure of fluid in chamber 16 will move pistons 10 and 9 in the direction of the right hand. The movable contact 76 in the circuit changing device 43 is relatively short like the contact 77 and thus adapted to interrupt the circuit through magnet 26 of the electro-magnet device 38 just prior to the pistons 9 and 10 obtaining their neutral positions. When this circuit is thus interrupted, the magnet 26 of electro-magnet device 38 is deenergized permitting seating of the valve 28 and unseating of the valve 27. As a result the fluid under pressure is vented from piston chamber 16 through the pipe 17 to the atmosphere. The coil 22 controlling the locking pin 20 is deenergized in the neutral position of the manually operated switch device 45 as above described, so that as the pistons 9 and 10 obtain the neutral position shown, spring 21 will urge the locking pin 20 into recess 19 for preventing further movement of said pistons and for holding same in the neutral position as will be apparent.

Whenever the movable contact member 86 of the manually operated switch device 45 is returned to its neutral position, it will be noted that electric current is again supplied from the battery 88 through wire 90 to wire 7 so that with the clutch parts in the condition disconnecting the propulsion motor from the wheels of the vehicle the condition of the transmission device 2 may be changed, if desired.

Summary

From the above description it will be apparent that the improved control mechanism provides for selective control of the positioning of the arm 4 and shaft 3 thereby providing for selective control between the different drive connections between the propulsion motor and wheels of the vehicle. The control mechanism is positive in its operation and while the energy for actuating the pistons is in the form of fluid pressure the loss thereof is minimized, due to conditions such as leakage, since fluid pressure is not required for holding the pistons in their positions but merely for moving same to said positions. It will be noted that the pistons, electro-magnet devices, and the circuit selector mechanism 40 may be intimately associated with the device to be controlled, while the manually operated switch 45 may be conveniently located for operation by the operator at any remote point, since the only connecting medium between these parts is a plurality of electrical conductors or wires which may be readily installed without difficulty on any vehicle. The electric control of the position changing mechanism is particularly adapted for use where it is desired to control from a single manually operated switch device a plurality of such mechanisms located either on one vehicle or on each of several vehicles of a train.

While only one illustrative embodiment of the invention has been shown and described in detail it is not the intention to limit the scope to that embodiment or otherwise than by the terms of the appended claims.

Having now described my invention, what I claim as new and desire to secure by Letters Patent is:

1. Control mechanism for selectively effecting movement of a member to any one of three different control positions, comprising, power actuated means having a neutral position and at either side thereof another position and being operative upon movement by power to each of said positions to position said member in a corresponding position, a manually operative device having positions corresponding to those of said power actuated means, and selector means operable by said power means to positions corresponding to those of said power means, said selector means being cooperative with said manually operative device upon movement thereof to any one of its positions to effect an application of power to said power means for moving said member and selector means to the corresponding position, and said selector means being operative upon movement to said corresponding position to effect a cutting off of power to said power means, and means conditionable by said manually operative device in the neutral position thereof for locking said member in its neutral position upon movement thereto, said means being operable in the other positions of said manually operative device to release said member for movement.

2. A control mechanism for selectively effecting movement of a movable control member to either one of three control positions including a neutral position and at either side thereof another position, comprising, power means including movable abutment means adapted to be operated by fluid under pressure supplied to one chamber for moving said member in the direction of one extreme position and to another chamber for moving said member in the opposite direction, electrically controlled means operative upon energization to effect the supply of fluid under pressure to one of said chambers and upon deenergization to vent fluid under pressure from the said one chamber, other electrically controlled means operative upon energization to effect a supply of fluid under pressure to the other of said chambers and upon deenergization to vent the fluid under pressure therefrom, a manually operative device having positions corresponding to those of said member, and circuit changing means movable with said member and cooperative with said manually operative device upon movement thereof to a selected position to effect energization of the electrically controlled means for effecting movement of said control member to the corresponding position, said circuit changing means being operative upon said member attaining the position selected by said manually operative device to effect deenergization of the last named electrically controlled means, and other electrically controlled means operative upon deenergization to lock said control member in neutral position, said manually operative device being operative in neutral position to effect deenergization of the last named electrically controlled means and upon movement to both other positions energization thereof.

3. A mechanism for controlling a clutch and the conditioning of a power transmission device to provide for different directions of movement of a vehicle, said clutch and device being connected in series between a propulsion motor and wheels of the vehicle, a change in condition of said transmission device being dependent upon a chosen electrical condition of an electric conductor, said mechanism comprising a clutch control member having a neutral, clutch disengaged position and at either side thereof a clutch driving position, fluid pressure power means for positioning said control member and operative by fluid under pressure supplied to one chamber for moving said control member from one of the driving positions to either said neutral position or to the other driving position and operative by fluid under pressure supplied to another chamber for moving said member from said other driving position to either said neutral position or to the first named driving position, electrically controlled means operative upon energization to supply fluid under pressure to one of said chambers and upon deenergization to vent fluid under pressure therefrom, other electrically controlled means operative upon energization to supply fluid under pressure to the other chamber and upon deenergization to vent fluid under pressure therefrom, a manually operative switch device having positions corresponding to the positions of said movable member and being operative only in said neutral position to provide said chosen electrical condition of said conductor, a selector switch movable with said member and cooperative with said manually operative switch device upon movement thereof to a selected position to effect energization of the electrically controlled means for operating said power means to move said member to the corresponding position, said selector switch being operative in said corresponding position to effect deenergization of the last named electrically controlled means.

4. A control mechanism comprising reciprocable power means having a neutral position and at either side thereof another position and being movable from said neutral position to one of said other positions upon a variation in pressure in one chamber and to the other of said other positions upon a variation in pressure in another chamber, manually operative means having positions corresponding to the said positions of said power means, selector means conditionable by said power means in accordance with the positions thereof to cooperate with said manually operative means to effect variations in pressure in either one or the other of said chambers to position said power means in accordance with the position of said manually operative means, and locking means operative in neutral position of said power means to secure said power means against movement, said locking means being controlled by said manually operative means and rendered effective in the neutral position thereof and ineffective in its other positions.

5. A control mechanism comprising reciprocable power means having a neutral position and at either side thereof another position and being movable from said neutral position to one of said other positions upon a variation in pressure in one chamber and to the other of said other positions upon a variation in pressure in another chamber, manually operative means having positions corresponding to the said positions of said power means, selector means conditionable by said power means in accordance with the position thereof to cooperate with said manually operative means to effect variations in pressure in either one or the other of said chambers to position said power means in accordance with the position of said manually operative means, said selector means being operable to terminate the variation in pressure in said chambers upon movement of said power means to the position corresponding to that of said manually operative means, locking means for securing said power means against movement out of said neutral position, said manually operative means controlling said locking means and rendering same effective in neutral position of said manually operative means and ineffective upon movement of said manually operative means to either of its other positions.

6. A control mechanism comprising movable abutment means controlled by the opposing pressures in two chambers, said means having a neutral position and at either side thereof another position and being movable to either one or another of said positions in accordance with a variation in pressure in either one or the other of said two chambers, manually operative means having a position for effecting a variation in pressure in one of said chambers and another position for effecting a variation in pressure in the other of said chambers, a lock for securing said movable abutment means in said neutral position, said manually operative means in the last named position being operative to render said lock effective and upon movement to the first named position ineffective, and means conditionable by said abutment means to cooperate with said manually operative means in its different positions to effect said variations in pressures in said chambers and operative automatically to effect equalization of the pressures in said chambers upon movement of said abutment means to the positions determined by the first named position of said manually operative means and in the position in which said lock is effective.

7. A control mechanism comprising movable abutment means controlled by the opposing pressures in two chambers, said means having a neutral position and at either side thereof another position and being movable to either one or another of said positions in accordance with a variation in pressure in either one or the other of said two chambers, manually operative means having a position for effecting a variation in pressure in one of said chambers and another position for effecting a variation in pressure in the other of said chambers, said movable abutment means having a projecting portion movable therewith, a locking means arranged to cooperate with said projecting portion in neutral position of said movable abutment means to secure said movable abutment means against movement out of said neutral position, said manually operative means controlling said locking means and being operative in the last named position of said manually operative means to render said locking means effective and upon movement to the first named position ineffective, and means conditionable by said abutment means to cooperate with said manually operative means in its different positions to effect said variations in pressures in said chambers and operative automatically to effect equalization of the pressures in said chambers upon movement of said abutment means to the positions determined by the first named position of said manually operative means and in the position in which said locking means is effective.

8. A control mechanism comprising movable abutment means controlled by the opposing pressures in two chambers, said means having a neutral position and at either side thereof another position and being movable to either one or another of said positions in accordance with a variation in pressure in either one or the other of said two chambers, manually operative means having a position for effecting a variation in pressure in one of said chambers and another position for effecting a variation in pressure in the other of said chambers, said movable abutment means comprising two spaced pistons one of which is subject on its outer face to the pressure in one of said chambers while the other is subject on its outer face to the pressure in the other of said chambers, means connecting said pistons, a locking element arranged to cooperate with the piston connecting means in the neutral position of said movable abutment means to secure said movable abutment means against movement from said neutral position, said manually operative means controlling said locking element and rendering same effective in the last named position of said manually operative means and ineffective upon movement of said manually operative means to its first named position, and means conditionable by said abutment means to cooperate with said manually operative means in its different positions to effect said variations in pressures in said chambers and operative automatically to effect equalization of the pressures in said chambers upon movement of said abutment means to the positions determined by the first named position of said manually operative means and in the position in which said locking element is effective.

9. A control mechanism for a rockable shaft having a neutral position and at either side thereof another position, said mechanism comprising a casing, reciprocable piston means in said casing connected to said shaft and having positions corresponding to the positions of said shaft and operable upon a variation in pressure in a chamber at one side of said piston means to rock said shaft to one of its last named positions and operable upon a variation in pressure in a chamber at the opposite side of said piston means to rock said shaft to the other of its last named positions, a member projecting from said piston means, a magnet device carried by said casing and having a movable armature disposed to move into contact with said member, said armature being arranged to cooperate with said member only in the neutral position of said piston means to lock said piston means against movement from said neutral position, spring means operative on said armature to move same into cooperative locking contact with said member, energization of said magnet being operative to move said armature against said spring means to release said armature from said member, means for controlling the variations in pressure in said chambers, and means for controlling the energization and deenergization of said magnet.

10. A mechanism for rocking a shaft to any one of three different positions including a neutral position and a control position at either side of said neutral position, said mechanism comprising reciprocatory piston means connected to said shaft and having positions corresponding to the positions of said shaft, said piston means being operative upon a variation in pressure in a chamber at one side thereof to move in the direction of one control position and upon a variation in pressure in another chamber at the opposite side of said piston means to move in the direction of the other control position, electroresponsive means operative upon energization to effect a variation in pressure in one of said chambers, other electroresponsive means operative upon energization to effect a variation in pressure in the other of said chambers, a manually operative switch having positions corresponding to the positions of said piston means, and selector switch means conditionable in accordance with the position of said shaft and cooperative with said manually operative switch upon movement thereof to any one of its positions to effect energization of the electroresponsive means for effecting movement of said piston means to the corresponding position and operative to effect deenergization of the last named electroresponsive means upon said piston means obtaining the position corresponding to that of said manually operative switch, said selector switch means comprising a contactor secured to rock with said shaft and arranged to control the circuits through said electroresponsive means in the said two control positions of said manually operative switch, and another contactor secured to rock with said shaft and arranged to control circuits through said electroresponsive means upon movement of said manually operative switch from either of its control positions to its neutral position, a plunger associated with said piston means and arranged to cooperate therewith only in the neutral position thereof to secure said piston means against movement from said neutral position, a spring for operating said plunger to its locking position, a magnet operative upon energization to move said plunger to a release position for releasing said piston means for movement, and another contactor secured to rock with said shaft and cooperative with said manually operative switch upon movement to either of its control positions to effect energization of said magnet, the last named contactor opening the circuit through said magnet upon movement of said piston means out of neutral position.

MORTIMER B. CAMERON.